United States Patent [19]
Knudsen

[11] Patent Number: 5,906,090
[45] Date of Patent: May 25, 1999

[54] LAWN MOWER MOUNTED AERATOR WHEEL

[76] Inventor: Morris Knudsen, 2531-79 st., Edmonton, Alberta, Canada, T6K 3W7

[21] Appl. No.: 09/014,007

[22] Filed: Jan. 27, 1998

[51] Int. Cl.$^6$ .................................................. A01D 34/86
[52] U.S. Cl. .............................................. 56/16.7; 172/21
[58] Field of Search .................................... 56/14.7, 16.7, 56/16.8, 249, 255, 295, 320.1, 322, DIG. 3, DIG. 9, DIG. 10; 172/14, 15, 21, 22; 301/44.1, 64.7, 44.4, 46, 47, 48

[56] References Cited

U.S. PATENT DOCUMENTS

| | | | |
|---|---|---|---|
| 2,591,572 | 4/1952 | Mascaro | 172/22 |
| 2,730,856 | 1/1956 | Mekalainas | 172/21 X |
| 3,057,411 | 10/1962 | Carlton | 172/15 |
| 3,112,138 | 11/1963 | Kauer | 301/47 |
| 4,735,038 | 4/1988 | Williams | 56/16.7 X |
| 5,368,371 | 11/1994 | Markling | 301/64.7 |
| 5,528,891 | 6/1996 | Wzietek | 56/16.7 |
| 5,662,172 | 9/1997 | Brown | 172/22 |

*Primary Examiner*—Terry Lee Melius
*Assistant Examiner*—Robert Pezzuto
*Attorney, Agent, or Firm*—Bauer & Schaffer, LLP

[57] ABSTRACT

An aerating device adapted to be retrofit to existing household lawn mowers comprising a pair of wheels each having a plurality of tines extending therefrom for penetrating a lawn and removing therefrom a section of soil, thereby aerating the lawn. The tines are offset from the center of the wheel to utilize the rotational energy of the wheel and the weight of the lawn mower to penetrate the lawn without the application of additional force by the user. In this manner, a user can simultaneously cut his/her lawn and aerate the same.

5 Claims, 4 Drawing Sheets

5,906,090

LAWN MOWER MOUNTED AERATOR WHEEL

BACKGROUND OF THE INVENTION

The present invention relates to an apparatus for aerating lawns and, in particular, to a aerating device for use with a conventional household lawn mower.

Aeration of a lawn is necessary to permit nutrients and water to reach the root system, thereby promoting a lush, healthy lawn. Aeration is accomplished by creating holes in the soil or by removing cylinders of soil from the lawn. The majority of aerating devices currently available are large, expensive commercial units that are impractical for the average homeowner.

Other devices, designed for use by the homeowner, have failed to achieve commercial success due to various shortcomings, namely difficulty in use and expense. One such device is a manually operable unit designed to be plunged by the user into the soil, requiring significant physical strength as well as a great deal of time to aerate an average sized lawn.

Attempts at providing aeration devices have been made in which their is a spiked wheel attached to the rear end of a lawn mower as well as another wheel attached spring device which in turn is attached to the rear end of a lawn mower. This apparatus is rather complicated in construction and its rearward location interferes with the bagging operation of the lawn mowers. Furthermore, when this device is used on lawn mowers that are manufactured with protective guards designed to stop debris from hitting the operator's feet its rearward location may interfere with the protective guard and in fact endanger the user. It is also difficult to both aerate and mow at the same time.

It is therefore, the object of the present invention to provide an aerating device that can be retrofit to existing manual and power lawn mowers, which does not have the disadvantages found in the prior art.

It is another object of the present invention to provide an aerating device for attachment to an existing lawn mower that is inexpensive, safe and simple in construction.

It is a further object of the present invention to provide an aerating device that does not interfere with the normal operation of the lawn mower, thereby allowing a user to simultaneously cut and aerate his/her lawn.

These advantages as well as others will be found in the following disclosure. Full details of the present invention are set forth in the following description and in the appended drawings.

SUMMARY OF THE INVENTION

To achieve the foregoing and other objectives, and in accordance with the purposes of the present invention, an aerating device is provided adapted to be retrofit to conventional manual and power lawn mowers. The aerating device comprises a pair of wheels adapted to replace the existing front wheels of the lawn mower, each wheel having a plurality of tines about the circumference thereof and extending beyond the periphery of the wheel. Each tine is configured to pierce the soil, utilizing the weight of the lawn mower and the forward motion as its impetus, and to remove a core of soil providing a hole or aperture to allow valuable water and nutrients to reach the roots of the lawn.

DETAILED DESCRIPTION OF THE INVENTION

Figure 1:
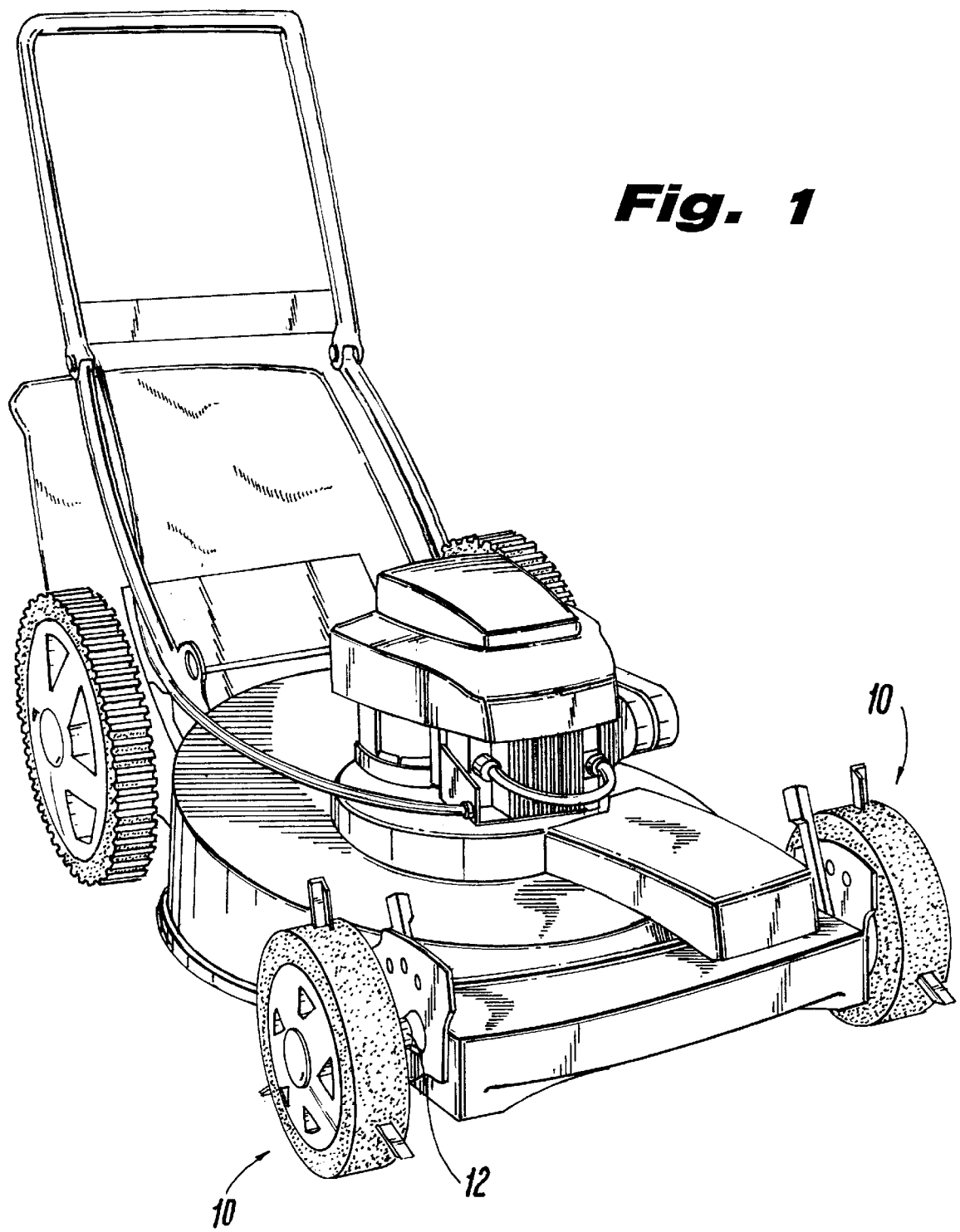
FIG. 1 is a perspective view of a lawn mower equipped with the aerating device according to the present invention.
Figure 2:
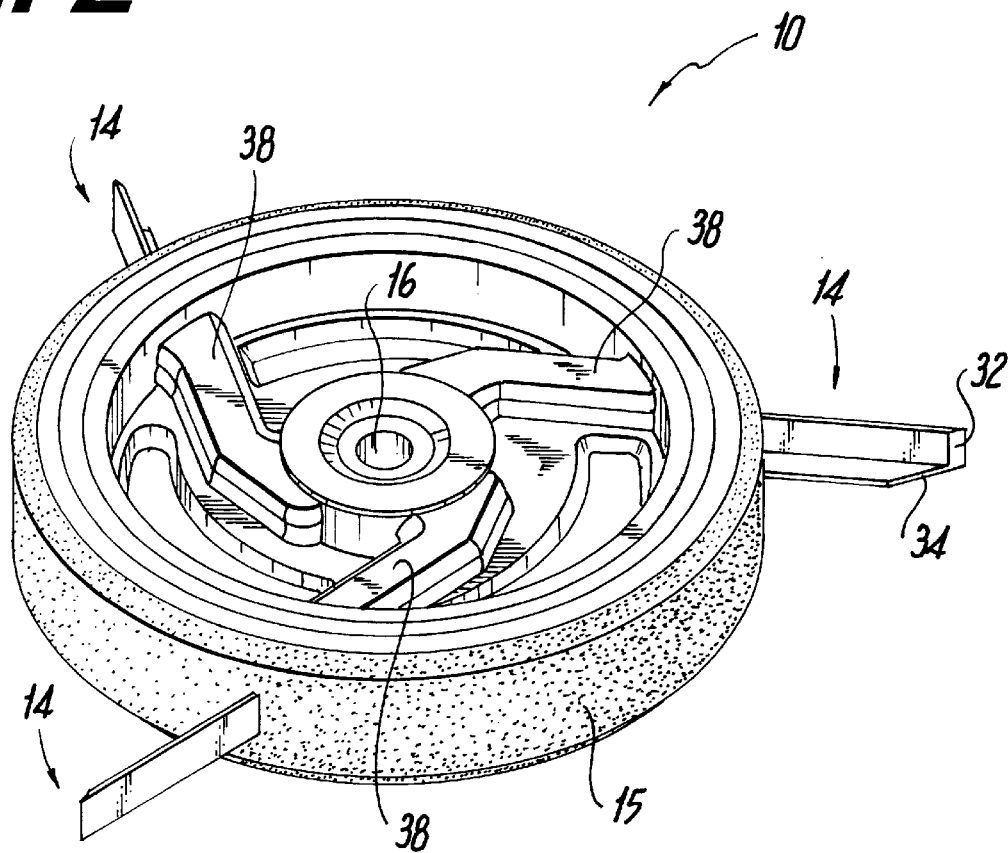
FIG. 2 is a perspective view of the aerating device according to the present invention.

As seen in FIG. 1, a power rotary lawn mower is equipped with devices according to the present invention at both its front wheels. The aerating wheel, generally depicted by the numeral 10, is preferable a plastic molding adapted to be attached to the front axle 12 replacing each front wheel of the lawn mower. The wheels 10 are identical or if desired constructed in mirror image. Consequently, for simplicity the details of a single wheel is illustrated and described in connection with the Figures.

As seen in FIGS. 2 through 5, the wheel 10 has a plurality of tines 14 dispersed about the circumference thereof and extending from the tread surface 15 of said wheel. Preferably the tines are uniformly spaced although this may not be necessary if fly-wheel construction is otherwise made.

The wheel 10 is provided with a through hole 16 so that it may be fastened to axle 12 of the mower with the existing bolt or like fastener. In this manner, the user can remove the front wheels of the lawn mower and replace them with the aerating wheels of the present invention. Although various size wheels can be employed, it is preferable that the wheels 10 be approximately six inches in diameter as this is the most common size wheel found on currently manufactured lawn mowers. It is also preferable that the through hole 16 be one half an inch in diameter which will allow the unit to fit most mower axles.

Figure 3:
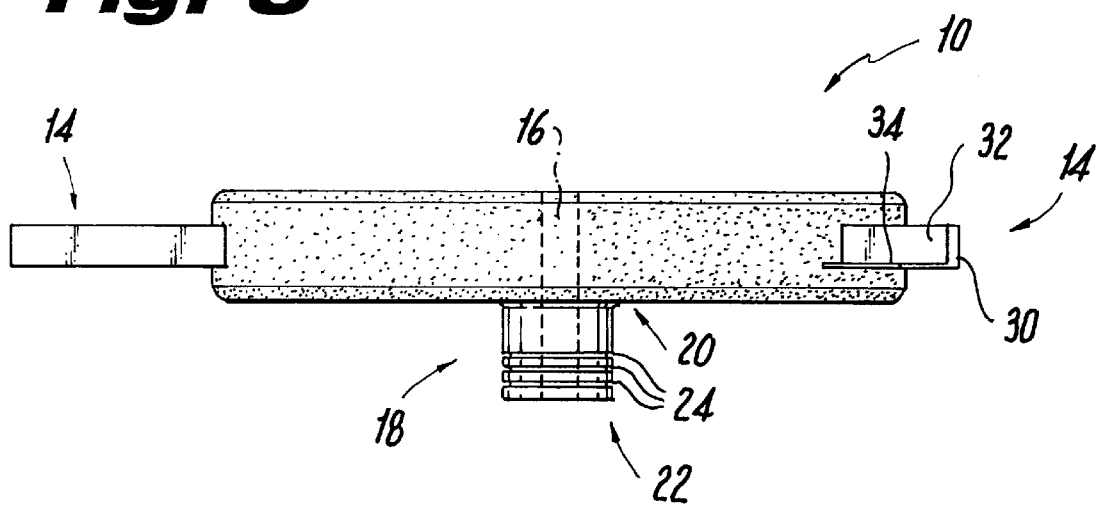
FIG. 3 is a top view of the aerating device according to the present invention.
Figure 5:
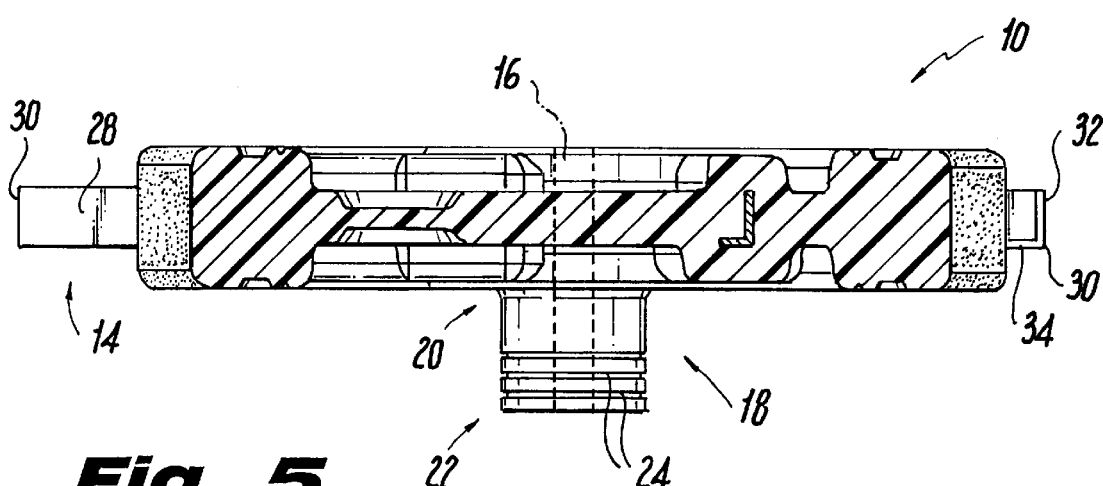
FIG. 5 is a sectional view of FIG. 3 taken along line A—A.

As seen in FIGS. 3 and 5, the through hole 16 is defined by a polymeric central hub 18 comprising a cylindrical tube having a first end 20 integral with the spokes of the wheel and a second end 22 extending therefrom whereby it may inserted into the mower housing. The second end 22 is provided with a series of grooves 24 allowing the user to easily cut the hub or flex the same, if necessary, to custom fit the wheel to their particular machine. The wheel 10 may be manufactured from a suitable plastic such as poly propylene using a conventional die or injection molding procedure.

As seen in FIGS. 3 and 5, tines 14 have inner ends located near the center of the wheel and a exposed end 28 terminating in a point 30 for penetrating the soil. The tines 14 are generally "L" shaped having a vertical wall portion 32 and horizontal wall portion 34. This structure allows each tine to remove a triangular section of soil and discard the same as the wheel rotates.

It is preferable that the vertical wall 32 be approximately ¼" high while the horizontal wall is approximately ½" wide. Further, it is preferable that the exposed end 28 be approximately 1¾". This size will clear the housing of most household units while at the same time allow penetration of the soil to an adequate depth to permit proper aeration. The tines of course can be sized to conform to various sized mowers.

The inner end of each tine is friction fitted within an associated spoke of the wheel. In the molding process, the mold is provided with a chamber in which the spoke is formed with a hollow body. After the molding process, but prior to cooling, the tines are inserted in this hollow body allowing the spoke to shrink fit around the tine during cooling. In this manner, the tines are secured to the wheel 10. The tines should be constructed from a durable weather resistant metal with sufficient strength such as 16 gauge galvanized steel.

Figure 4:
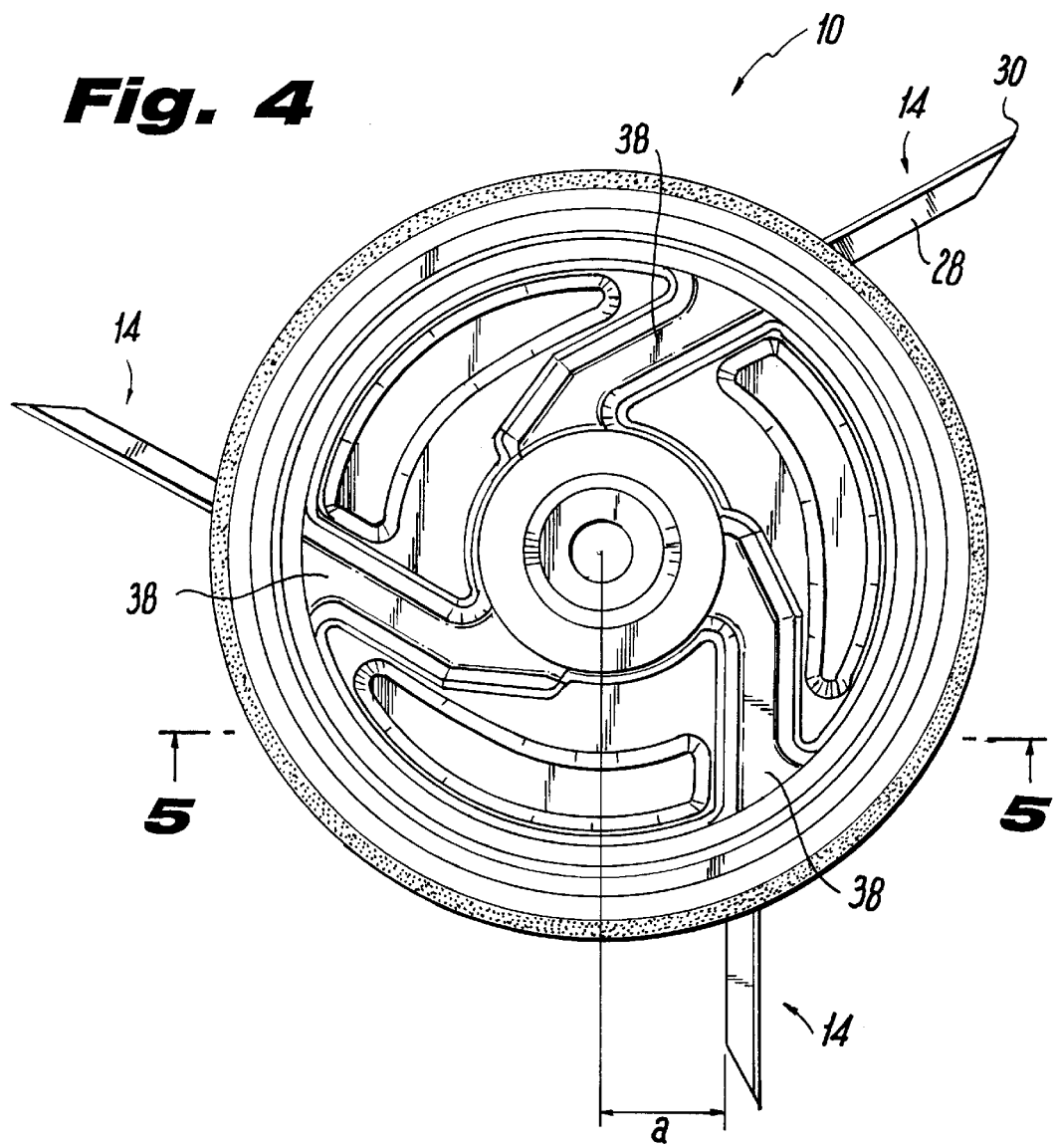
FIG. 4 is a side view of the aerating device according to the present invention.

As seen each tine is positioned 1" off the center of the wheel as designated by distance "a" in FIG. 4. This offset position of tines relative to the center of the wheel, described above, causes a pivot action during the rotation of the wheel which in conjunction with the shape of the tines permits the penetration of the soil without the need for a heavy machine, or the user, to exert a large downward force. As a result, a common lawn mower generates sufficient downward force to cause the tines to penetrate the soil, thereby aerating the same.

Figure 6:
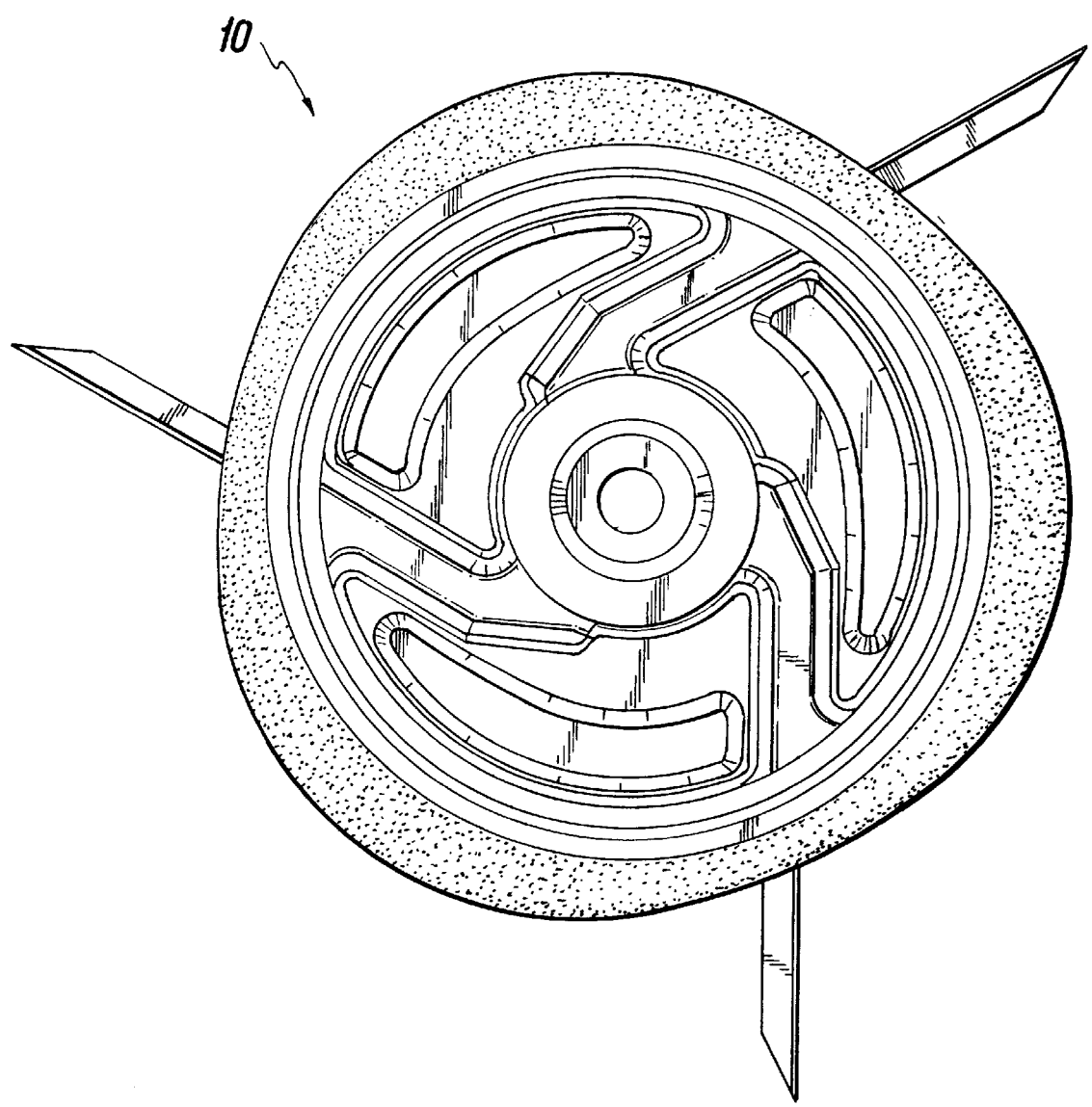
FIG. 6 is a side view of an alternate embodiment of the aerating device according to the present invention

An alternate embodiment of the present invention is shown in FIG. 6. As seen, in the alternate embodiment, the wheel 10 is provided with an irregular periphery to provide an eccentric circular shape. This causes the wheel to rise and fall as it traverses the ground. By placing the tines at selected positions, the introduction of the tines into the ground and their removal will be facilitated by the rise and fall of the wheel. Otherwise, the structure and function of the wheel and mower, as described in the previous embodiment, remains the same.

As described in the above disclosure, an aerating device for use with a convention household motor has been provided that can be retrofit to existing manual and power lawn mowers. In accord with the objects of the invention the device is simple in construction, inexpensive, safe and allows the user to simultaneously cut and aerate his/her lawn.

The foregoing disclosure has been presented for purposes of illustration and description. It is not intended to be exhaustive or to limit the invention to the precise form disclosed. Obvious modifications or variations are possible in light of the above teachings.

What is claimed is:

1. An aerating device for a conventional house-hold lawn mower for mowing a lawn on soil, wherein the conventional house-hold lawn mower has a weight, a plurality of wheel housings, a pair of front wheels connected by a front axle, and a pair of rear wheels connected by a rear axle, and wherein said device is for replacing at least one of the pair of front wheels of the conventional house-hold lawn mower and the pair of rear wheels of the conventional house-hold lawn mower, said device comprising:

a) a wheel for replacing each wheel of at least one of the pair of front wheels of the conventional house-hold lawn mower and the pair of rear wheel of the conventional house-hold lawn mower; said wheel having rotational energy when rotated, a center, and a periphery with a shape being eccentric which causes said wheel to rise and fall as said wheel traverses the lawn; and b) a plurality of tines extending radially outwardly from said periphery of said wheel, offset from said center of said wheel which causes a pivot action of said plurality of tines during rotation of said wheel that together with the rise and fall of said wheel caused by said eccentric shape of said periphery of said wheel facilitates introduction and removal of the plurality of tines from the lawn and the soil by utilizing only said rotational energy of said wheel and the weight of the conventional house-hold lawn mower without application of any additional force by a user.

2. The device as defined in claim 1, wherein said center of said wheel has a throughbore for receiving a respective one of at least one of the front axle of the conventional house-hold lawn mower and the rear axle of the conventional house-hold lawn mower.

3. The device as defined in claim 1, wherein each tine of said plurality of tines has:

a) a lateral profile that is uppercase L-shaped for allowing each tine of said plurality of tines to remove a triangular section of the soil and discard the triangular section of the soil as said wheel rotates; and b) an exposed free end that is pointed for facilitating penetration into the soil to an adequate depth.

4. The device as defined in claim 1, wherein said wheel further has a hub that is cylindrically-shaped and extends coaxially from and past, said throughbore in said center of said wheel; said hub of said wheel has a proximal end that is integral with said wheel and a distal end for extending into an associated wheel housing of the plurality of wheel housings of the conventional house-hold lawn mower.

5. The device as defined in claim 4, wherein said hub of said wheel has a plurality of grooves that extend circumferentially therearound and are axially spaced-apart for allowing the user to easily do one of cut and flex said hub of said wheel, if necessary, to custom fit said wheel to the conventional house-hold lawn mower.

* * * * *